US008371018B2

(12) United States Patent
Chang

(10) Patent No.: US 8,371,018 B2
(45) Date of Patent: Feb. 12, 2013

(54) ELECTROMECHANICAL TRANSDUCER AND MANUFACTURING METHOD THEREFOR

(75) Inventor: Chienliu Chang, Kawasaki (TW)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 12/678,365

(22) PCT Filed: Sep. 19, 2008

(86) PCT No.: PCT/JP2008/067576

§ 371 (c)(1),
(2), (4) Date: Mar. 16, 2010

(87) PCT Pub. No.: WO2009/041673

PCT Pub. Date: Apr. 2, 2009

(65) Prior Publication Data

US 2010/0207484 A1 Aug. 19, 2010

(30) Foreign Application Priority Data

Sep. 25, 2007 (JP) ................................ 2007-246868
Sep. 12, 2008 (JP) ................................ 2008-235056

(51) Int. Cl.
*H04R 31/00* (2006.01)
*H02N 1/00* (2006.01)

(52) U.S. Cl. .......................................... 29/594; 310/309

(58) Field of Classification Search .................. 310/309; 73/718, 514.32; 381/174, 191; 600/459; 29/594; *H01N 1/00; H04R 31/00*

See application file for complete search history.

(56) References Cited

U.S. PATENT DOCUMENTS

| | | | | |
|---|---|---|---|---|
| 6,426,582 | B1 * | 7/2002 | Niederer et al. | 310/309 |
| 6,877,383 | B2 * | 4/2005 | Horie et al. | 73/754 |
| 7,037,746 | B1 * | 5/2006 | Smith et al. | 438/53 |
| 7,047,814 | B2 * | 5/2006 | Zias et al. | 73/718 |
| 8,008,835 | B2 * | 8/2011 | Degertekin | 310/309 |
| 2003/0019299 | A1 | 1/2003 | Horie et al. | 73/718 |
| 2007/0052093 | A1 * | 3/2007 | Machida et al. | 257/735 |

(Continued)

FOREIGN PATENT DOCUMENTS

| | | |
|---|---|---|
| JP | 2005-027186 A | 1/2005 |
| JP | 2006-050314 A | 2/2006 |

(Continued)

OTHER PUBLICATIONS

Oxford English Dictionary, Oct. 28, 2011, Definition of "plastically" and "moulding", http://www.oed.com/.*

(Continued)

*Primary Examiner* — Quyen Leung
*Assistant Examiner* — Thomas Truong
(74) *Attorney, Agent, or Firm* — Fitzpatrick, Cella, Harper & Scinto

(57) ABSTRACT

In an electromechanical transducer which includes a vibration membrane provided with an upper electrode, a substrate provided with a lower electrode, and a support member adapted to support the vibration membrane in such a manner that a gap is formed between the vibration membrane and the substrate with these electrodes being arranged in opposition to each other, it is constructed such that a part of the vibration membrane and a region of the substrate are kept in contact with each other without application of an external force, and a remaining region of the vibration membrane other than its region in which the contact state is kept is able to vibrate.

10 Claims, 13 Drawing Sheets

U.S. PATENT DOCUMENTS

| | | | | |
|---|---|---|---|---|
| 2007/0057600 A1 | 3/2007 | Fukuda et al. | ................ | 310/324 |
| 2007/0161896 A1 | 7/2007 | Adachi et al. | ................. | 600/437 |
| 2010/0107758 A1 | 5/2010 | Kandori et al. | ............ | 73/504.08 |

FOREIGN PATENT DOCUMENTS

| | | | |
|---|---|---|---|
| JP | 2006-208135 | A | 8/2006 |
| JP | 2006-319712 | A | 11/2006 |
| WO | WO 03/009319 | A1 | 1/2003 |

OTHER PUBLICATIONS

B. Bayram et al., "Capacitive Micromachined Ultrasonic Transducer Design for High Power Transmission," IEEE Transactions on Ultrasonics, Ferroelectrics, and Frequency Control, vol. 52, No. 2, Feb. 2005, pp. 326-339.

Office Action dated Jun. 11, 2012 in counterpart Taiwanese Patent Application No. 097136733.

* cited by examiner

ELECTROMECHANICAL TRANSDUCER AND MANUFACTURING METHOD THEREFOR

TECHNICAL FIELD

The present invention relates to an electromechanical transducer and a method for manufacturing the same. The electromechanical transducer of the present invention is an acoustic transducer of a capacitive type particularly suitable for transmission or reception of an ultrasonic wave.

BACKGROUND ART

In recent years, there have been actively researched or studied capacitive ultrasonic transducers using micromachining processes (CMUT; Capacitive Micromachined Ultrasonic Transducer). Hereinafter, such a capacitive ultrasonic transducer is referred to as a CMUT. According to such a CMUT, there can be easily obtained a broadband characteristic that is excellent both in a liquid and in an air by transmitting and receiving an ultrasonic wave by the use of a vibration membrane. Therefore, with ultrasonic diagnostics using this CMUT, it becomes possible to make an ultrasonic diagnosis with higher precision than with a conventional medical diagnostic modality, and hence ultrasonic diagnostics is being noted as a promising technology in these days.

This CMUT has a construction in which a vibration membrane provided with an upper electrode and a substrate provided with a lower electrode are arranged in opposition to each other, and the vibration membrane is supported by a support member so as to form a gap between the vibration membrane and the substrate (see Japanese patent application laid-open No. 2006-319712). When this is driven to operate, an electrostatic attraction force is first generated between both the electrodes by applying a DC voltage to the lower electrode, so that the vibration membrane is thereby caused to deform. In addition, by superimposing a fine AC voltage thereon, the vibration membrane is vibrated to oscillate an ultrasonic wave. When the ultrasonic wave is received, the vibration membrane is caused to deform by reception of the ultrasonic wave, whereby the interval or distance between both the electrodes is changed, and a resultant change in the capacitance between both the electrodes is detected as a signal.

In order to enhance the mechano-electric transducing characteristic, it is desirable to decrease the interelectrode interval between the upper electrode provided at a vibration membrane side and the lower electrode provided at a substrate side. Therefore, by applying a high DC voltage, the vibration membrane can be deformed more greatly so as to make the above-mentioned interelectrode interval narrow. However, the application of such a high voltage also poses a problem in putting the formation of a surface insulation film on the transducer into practical use so as to avoid resultant adverse effects. In case where the CMUT with such a high voltage applied thereto is used for acoustic diagnostics, an unfavorable influence might be caused on human bodies.

In the past, as an example in which an interelectrode interval is made narrow by application of a low voltage, U.S. Pat. No. 6,426,582 discloses a CMUT which will be described below. In this U.S. Pat. No. 6,426,582, a vibration membrane is caused to deform downward, and in such a deformed state, a resist resin is heated and coated around the vibration membrane. Thereafter, the resist is cooled to harden, and the vibration membrane is fixed in its periphery with its shape being naturally deformed in a downward direction, whereby an interval between capacitive electrodes is formed to be small. In addition, this U.S. Pat. No. 6,426,582 adopts a construction in which the interelectrode interval is controlled by protrusions. That is, the construction adopted is such that the protrusions are formed on a lower side of the vibration membrane, and they alone are in contact with an underlayer substrate, with the central portion of the vibration membrane being not in contact with the underlayer.

On the other hand, in recent years, a collapse mode has being noted as a new operation mode different from a conventional mode that is an ordinary operation mode in a CMUT. This collapse mode means an operation mode in which when a DC voltage is applied to a lower electrode, a vibration membrane is attracted to an underlayer electrode under the action of a DC electrostatic force thereof, so that the vibration membrane is thereby made into a collapsed or crushed state in which it is caused to operate while being in contact with the lower electrode. In addition, this specific voltage is called a collapse voltage.

In this collapse mode, it is said that sensitivity and driving ability are higher than the above-mentioned conventional mode (see IEEE Transactions on Ultrasonics, Ferroelectrics, and Frequency Control, Vol. 52, No. 2, February 2005, p. 326-339). In this collapse mode, unlike the conventional mode in which a gap exists between the vibration membrane and the substrate, there is generated, in part of the vibration membrane including the upper electrode, a region that is in contact with a region of the substrate including the lower electrode. In this state, an ultrasonic wave can be oscillated or emitted by superposing a minute AC voltage to make those portions of the vibration membrane other than the contact region thereof vibrate by means of this minute AC voltage. In addition, an ultrasonic wave can also be received, just like in the above-mentioned conventional mode.

On the other hand, in order to operate the CMUT in the above-mentioned collapse mode, it is necessary to apply an extremely high DC voltage so as to place the vibration membrane into contact with the lower electrode. The DC voltage (collapse voltage) needed here is in the range of from about 130 to 150 V, and the CMUT can not be kept operating in this mode when such a voltage can not be provided. However, it is extremely difficult to put a circuit operating with such a high voltage to practical use, and in case where the CMUT, being operated with such a high voltage, is used for acoustic diagnostics, unfavorable influences might be exerted on human bodies. Moreover, if such a high voltage is applied, the vibration membrane might cause dielectric breakdown, thereby making the lower electrode and the upper electrode be short-circuited to each other.

In the past, in Japanese patent application laid-open No. 2005-27186, there has been proposed a CMUT which is constructed in the following manner so as to decrease a DC voltage in a collapse mode. In Japanese patent application laid-open No. 2005-27186, a construction is used in which a vibration membrane is attracted with the use of a magnet. Specifically, a part of the vibration membrane including a magnetic material is attracted by a magnetic field from the outside, whereby an interval between capacitive electrodes is decreased, as a result of which a high DC voltage (collapse voltage) is made unnecessary, thus lowering a required voltage.

In addition, in Japanese patent application laid-open No. 2006-50314, a construction is adopted in which a vibration membrane is electrified by a corona discharge treatment, thereby making a high DC voltage (collapse voltage) unnecessary.

As stated above, in order to operate a CMUT in a collapse mode, a high DC voltage of about 130-150 V (collapse voltage) is needed as a DC voltage (collapse voltage). Therefore, as referred to above, there arise problems such as circuit construction, influences on human bodies, a short-circuit between a lower electrode and an upper electrode, etc.

Further, even in the above-mentioned examples that have been proposed for coping with these problems, the following unfavorable influences are given to the vibration mass, the rigidity, the stability, etc., of the vibration membrane.

For instance, in Japanese patent application laid-open No. 2005-27186 in which the lowering of the voltage is intended by the vibration membrane being attracted with the use of the magnet, not only deposition and magnetization of a magnetic material on an upper portion (or an internal portion or a lower portion) of the vibration membrane become necessary, but also a magnetic field forming means is required for the underlayer substrate, resulting in a complicated structure. In addition, there is also a problem in that an amount of initial displacement of the vibration membrane is attracted by the magnetic field, and hence is liable to be influenced by external magnetic fields and external disturbances.

Also, in Japanese patent application laid-open No. 2006-50314 in which a vibration membrane is electrified by a corona discharge treatment, there are the following problems. That is, the amount of electrification by an electrical discharge is liable to be influenced by environmental factors such as humidity, dielectric substances, etc., and the amount of electrification in the vibration membrane and the amount of initial displacement thereof are unstable, and variation between elements is large.

In addition, in U.S. Pat. No. 6,426,582 in which the protrusions are formed on the lower side of the vibration membrane, and they alone are in contact with the underlayer substrate, with the central portion of the vibration membrane being not in contact with the underlayer, only a space formed inside the protrusions vibrates, and those portions outside the protrusions are fixedly held against vibration by means of the resist.

Accordingly, this can not be called operating in a collapse mode in a strict meaning, but if this is converted into a collapse mode, there will be the following problems. That is, in case where the deformed shape of the vibration membrane is kept by such hardening of the resist, the shape of the vibration membrane is changed and is made unstable due to a change over time of the resist, and/or a temperature-related change in property or quality thereof. In addition, because the resist covers an outer periphery of the vibration membrane, there is also another problem that an effective area (filling factor) receiving an ultrasonic wave is decreased.

DISCLOSURE OF THE INVENTION

The present invention has an object to provide an electromechanical transducer and a method for manufacturing the same. In view of the above-mentioned problems, when the transducer is made to operate in a collapse mode, the state of contact between a vibration membrane and a substrate provided with a lower electrode can be kept without applying an external force thereto, thereby making it possible to perform voltage reduction in a stable manner.

Also, in view of the above-mentioned problems, the present invention has another object to provide an electromechanical transducer and a method for manufacturing the same which can be driven in a more stable manner in a state in which a DC voltage to be applied is more reduced even in a conventional mode.

The present invention provides electromechanical transducers and methods for manufacturing the same which are constructed as follows.

An electromechanical transducer according to the present invention is characterized by comprising: a vibration membrane provided with a first electrode, a substrate provided with a second electrode, and a support member adapted to support the vibration membrane in such a manner that a gap is formed between the vibration membrane and the substrate with these electrodes being arranged in opposition to each other, wherein a part of the vibration membrane and a region of the substrate are kept in contact with each other with no external force being applied to the vibration membrane, and a remaining region of the vibration membrane other than its region in which the contact state is kept is able to vibrate.

In addition, the electromechanical transducer according to the present invention is characterized in that in the region in which the contact state is kept, the vibration membrane is fusion bonded to the substrate.

Moreover, the electromechanical transducer according to the present invention is characterized in that in the region in which the contact state is kept, the vibration membrane is brought into contact with, or is fusion bonded to, the substrate through protrusions that are formed on at least one of an upper surface and a lower surface of the vibration membrane.

Further, the electromechanical transducer according to the present invention is characterized in that the protrusions have a height in the range of from 10 nm to 200 nm.

Furthermore, the electromechanical transducer according to the present invention is characterized in that the protrusions are arranged in a ring shape so as to surround the region in which the contact state is kept.

In addition, a method for manufacturing an electromechanical transducer according to the present invention, in which the transducer includes a vibration membrane provided with a first electrode, a substrate provided with a second electrode, and a support member adapted to support the vibration membrane in such a manner that a gap is formed between the vibration membrane and the substrate with these electrodes being arranged in opposition to each other, is characterized by comprising a step of forming a structure in which the vibration membrane is caused to plastically deform in such a manner that it is caused to operate in a collapse mode with a part of the vibration membrane being kept in contact with a region of the substrate including the second electrode.

Moreover, the method for manufacturing an electromechanical transducer according to the present invention is characterized by comprising fusion bonding a part of the vibration membrane that has been plastically deformed to the region of the substrate when the structure to keep the contact state is formed.

Further, the method for manufacturing an electromechanical transducer according to the present invention is characterized by comprising forming protrusions on at least one of an upper surface and a lower surface of the vibration membrane, wherein when the structure to keep the contact state is formed, the vibration membrane is brought into contact with, or is fusion bonded to, the substrate through the protrusions.

Furthermore, the method for manufacturing an electromechanical transducer according to the present invention is characterized in that the protrusions have a height in the range of from 10 nm to 200 nm.

In addition, the method for manufacturing an electromechanical transducer according to the present invention is characterized in that the protrusions are formed into a ring shape so as to surround the region in which a contact state is kept.

Moreover, another electromechanical transducer according to the present invention is characterized by comprising a vibration membrane provided with a first electrode, a substrate provided with a second electrode, and a support member adapted to support the vibration membrane in such a manner that a gap is formed between the vibration membrane and the substrate with these electrodes being arranged in opposition to each other, wherein the vibration membrane keeps its state in which it is flexed toward the substrate side from its neutral position with no external force being applied to the vibration membrane.

Further, another method for manufacturing an electromechanical transducer according to the present invention, in which the transducer includes a vibration membrane provided with a first electrode, a substrate provided with a second electrode, and a support member adapted to support the vibration membrane in such a manner that a gap is formed between the vibration membrane and the substrate with these electrodes being arranged in opposition to each other, is characterized by comprising a step of plastically deforming the vibration membrane to form a state in which the vibration membrane is flexed toward the substrate side from its neutral position.

According to the present invention, it is possible to achieve an electromechanical transducer and a method for manufacturing the same in which when the transducer is made to operate in a collapse mode, the state of contact between a vibration membrane and a substrate provided with a lower electrode can be kept without application of an external force, thereby making it possible to perform voltage reduction in a stable manner.

In addition, according to the present invention, it is possible to achieve an electromechanical transducer and a method for manufacturing the same which can be driven in a more stable manner in a state in which a DC voltage to be applied is more reduced even in a conventional mode.

Other features and advantages of the present invention will be apparent from the following description taken in conjunction with the accompanying drawings, in which like reference characters designate the same or similar parts throughout the figures thereof.

DESCRIPTION OF EMBODIMENTS

Preferred embodiments of the present invention will now be described in detail in accordance with the accompanying drawings.

Electromechanical transducers according to the present invention are suitably used as acoustic transducers that are used in particular for transmission and reception of acoustic waves, and are further suitably used as ultrasonic transducers that are used for transmission and reception of ultrasonic waves.

The term "sound or acoustic wave" in this specification is not limited to an elastic wave transmitting in air, but is a generic name for all kinds of elastic waves that transmit through elastic bodies irrespective of their states, i.e., gas, liquid or solid. In other words, it is a broad concept even including an ultrasonic wave that is an elastic wave of frequencies exceeding human audio frequencies.

The electromechanical transducers according to the present invention can be applied, as ultrasonic probes, to ultrasonic diagnostic apparatuses (echographers) or the like. Hereafter, the present invention will be described as ultrasonic transducers (ultrasonic sensors) that transmit or receive ultrasonic waves, but it is evident that acoustic waves which can be detected are not limited to ultrasonic waves if consideration is given to the principles of the transmission and reception of the acoustic sensors of the present invention.

Embodiment 1

Now, reference will be made to a capacitive micromachined ultrasonic transducer (CMUT) according to a first embodiment of the present invention.

Figure 1A:
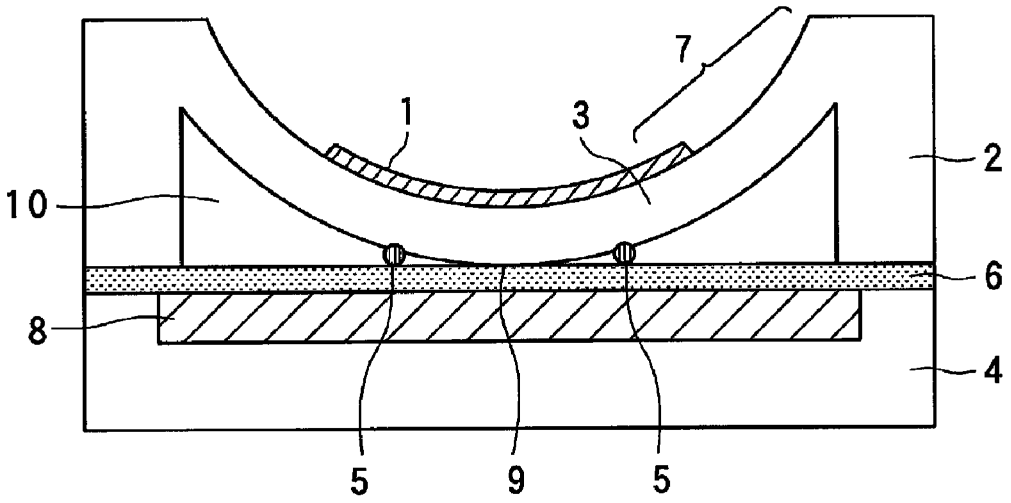
FIG. 1A is a conceptual cross sectional view illustrating a basic construction of a capacitive micromachined ultrasonic transducer (CMUT) in a first embodiment of the present invention.
Figure 1B:
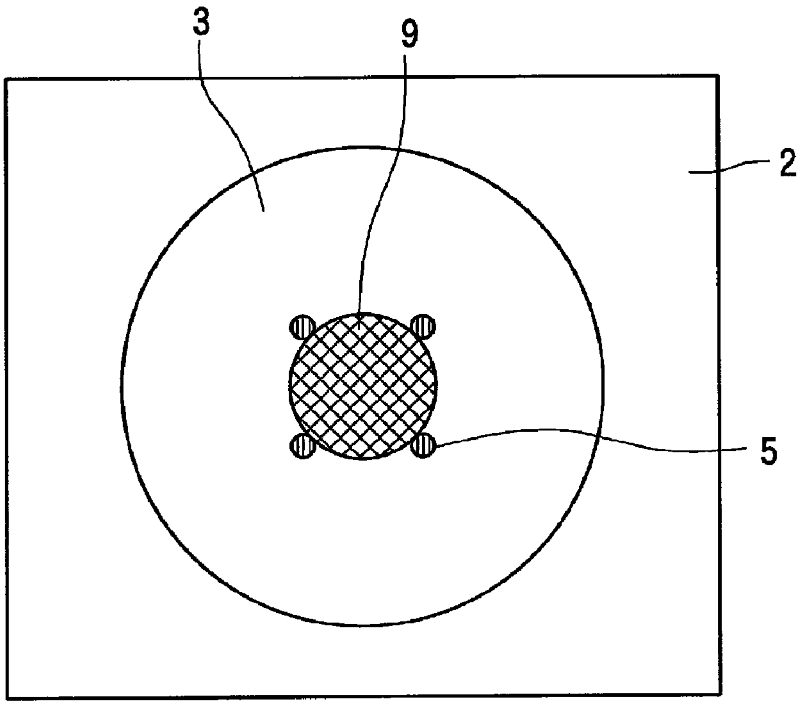
FIG. 1B is a conceptual plan view illustrating the basic construction of the CMUT in the first embodiment.

FIG. 1A and FIG. 1B are views illustrating a basic construction of a capacitive micromachined ultrasonic transducer (CMUT) in the first embodiment of the present invention. FIG. 1A is a conceptual cross sectional view of the capacitive micromachined ultrasonic transducer (CMUT), and FIG. 1B is a conceptual plan view of the capacitive micromachined ultrasonic transducer (CMUT).

In FIG. 1A and FIG. 1B, 1 designates an upper electrode which is a first electrode, 2 a vibration membrane support member, 3 a vibration membrane, 4 a substrate, 5 protrusions, 6 an insulation film, 7 an outer peripheral portion of the vibration membrane, 8 a lower electrode which is a second electrode, 9 a contact region (fusion bonded region), and 10 a cavity.

The CMUT of this embodiment includes, as shown in FIG. 1A, the vibration membrane 3 provided with the upper electrode 1, the substrate 4 provided with the lower electrode 8, and the vibration membrane support member 2 that serves to support the vibration membrane so as to form a gap between the vibration membrane and the substrate with these electrodes being arranged in opposition to each other. The vibration membrane 3 is able to vibrate by receiving mechanical energy, such as receiving an ultrasonic wave.

On the substrate 4, there is formed the lower electrode of a low resistance, on which is further disposed the insulation film 6. Here, the insulation film 6 plays the role of preventing the lower electrode 8 and the upper electrode 1 from being short circuited to each other. The vibration membrane support member 2, which serves to support the vibration membrane 3, is fixedly mounted on the substrate 4 through the insulation film 6. Here, note that the lower electrode 8 itself may be used as a substrate, or the vibration membrane 3 itself may be used as an upper electrode.

In this embodiment, it is constructed such that a part of the vibration membrane including the upper electrode and a region of the substrate including the lower electrode are kept in contact with each other with no external force being applied to the vibration membrane 3. In the case of the vibration membrane being "in contact with the substrate", it is to be understood that in the case of the insulation film 6 being provided, the whole including not only the substrate 4 but also even the insulation film 6 constitutes a lower substrate.

In addition, the vibration membrane 3 is constructed in such a manner that a region of the vibration membrane 3 other than that in which the state of contact is kept can vibrate upon reception or transmission of an ultrasonic wave. In that case, in order to form the region in which the state of contact with this substrate is kept, the vibration membrane 3 is deformed into a downwardly concaved shape, thereby forming the contact region 9 which is in contact with the insulation film 6. Such a downwardly concaved deformation can be formed, for instance, by plastic deformation, and the contact region 9 can serve to fusion bond the vibration membrane 3 to the insulation film 6, thereby to form a fusion bonded region.

Thus, by the formation of the contact region (fusion bonded region), there is formed the cavity 10 which is enclosed by the substrate 4, the vibration membrane 3, and the vibration membrane support member 2. As a result, a collapse mode can be achieved without applying any external force to the vibration membrane. Accordingly, driving at a low voltage is made possible. Here, the term "external force" is an external force when attention is focused on the vibration membrane 3, and it means a force acting from the outside of the vibration membrane 3. For instance, as such, there can be exemplified an electrostatic attraction, a magnetic force, etc.

Also, in this embodiment, it can be constructed such that the region in which the above-mentioned state of contact is kept is fusion bonded to the substrate through protrusions that are formed on at least one of an upper surface and a lower surface of the vibration membrane. For instance, the protrusions 5 are formed on an outer edge or periphery of the contact region (fusion bonded region) 9 prior to the formation of the contact region (fusion bonded region) 9 (see FIG. 1B), so that when the vibration membrane 3 is placed in contact with (fusion bonded to) the insulation film 6, the area of contact (fusion bonding) is controlled by means of the protrusions 5. That is, the area of contact (fusion bonding) or the shape of contact (fusion bonding) is controlled by means of these protrusions 5.

The upper electrode 1 is formed on or in at least one of the upper (front) surface, the lower (rear) surface, and the internal portion of the vibration membrane 3, or the main body of the vibration membrane 3 itself is formed by the upper electrode 1. In addition, the upper electrode 1 is arranged in opposition to the lower electrode 8, whereby the electrostatic capacitive electrodes of the CMUT in this embodiment are formed.

As shown in a conceptual plan view of the CMUT in FIG. 1B, the vibration membrane 3 is supported by the vibration membrane support member 2 lying in an outer edge thereof. In this embodiment, the contact region (fusion bonded region) 9 is formed between the vibration membrane 3 and the substrate 4 in the central portion of the vibration membrane 3. The area or shape of the contact region (fusion bonded region) 9 is controlled by means of the protrusions 5 that are disposed on the outer edge of the contact region (fusion bonded region) 9.

Next, reference will be made to a capacitive micromachined ultrasonic transducer (CMUT) according to this embodiment of the present invention.

FIG. 2A through FIG. 2M are views illustrating the manufacturing processes or steps for the capacitive micromachined ultrasonic transducer (CMUT) in this embodiment of the present invention. In order to make the following explanation concise, a "patterning process" herein is assumed to include various processes ranging from the processes of photolithography, such as applying a photoresist on the substrate, drying, exposing, developing the photoresist, etc., to other processes such as an etching process, a process of removing the photoresist, a process of washing the substrate, a process of drying the substrate, and so on.

In the following, reference will be made to a process or step of forming a structure in which the vibration membrane is caused to plastically deform in such a manner that it is caused to operate in a collapse mode with a part of the vibration membrane being kept in contact with a region of the substrate including the lower electrode.

Figure 2A:
FIG. 2A through FIG. 2M are views illustrating the manufacturing processes or steps for the capacitive micromachined ultrasonic transducer (CMUT) in the first embodiment of the present invention.
Figure 2B:
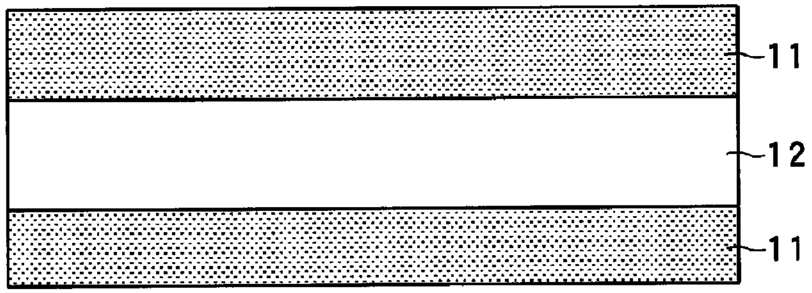

In the manufacturing processes of this embodiment, a Si substrate 12 is first washed and prepared, as shown in FIG. 2A. Then, the Si substrate 12 is put into a thermal oxidation furnace so that a Si oxide film 11 is formed therein, as shown in FIG. 2B. Preferably, the thickness of this Si oxide film is in the range of from 10 nm to 4,000 nm, more preferably in the range of from 20 nm to 3,000 nm, and most preferably in the range of from 30 nm to 2,000 nm. A rough or approximate distance between the electrodes is decided according to the above-mentioned thermal oxidation process. If in the above ranges, the thickness is in a feasible or allowable range in actual processes, and a reasonable electric field can be obtained.

Figure 2C:
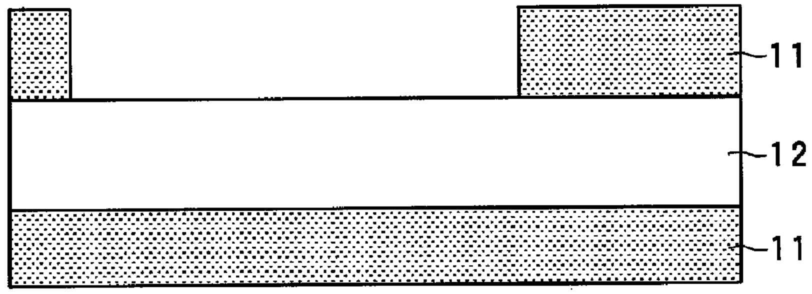

Subsequently, the thermal oxide film 11 is subjected to patterning, as shown in FIG. 2C.

Figure 2D:
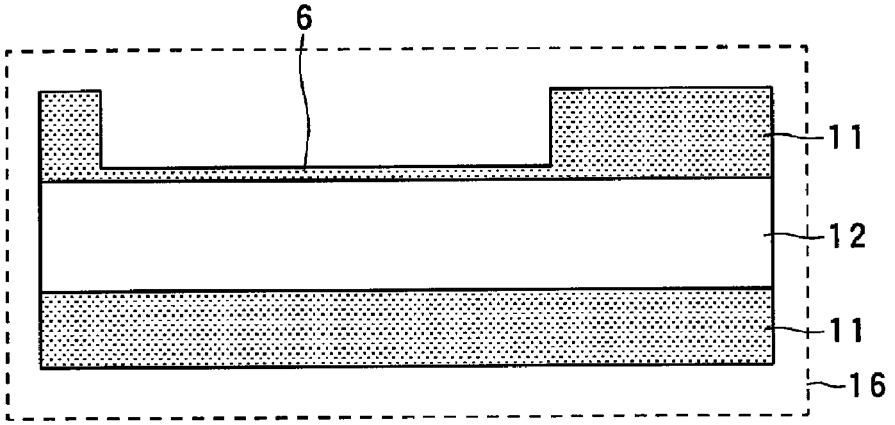

Thereafter, a second thermal oxidation process is performed to form an insulation film 6 in the form of a thin thermal oxide film, as shown in FIG. 2D. Preferably, the thickness of the insulation film 6 is in the range of from 1 nm to 500 nm, more preferably in the range of from 5 nm to 300 nm, and most preferably in the range of from 10 nm to 200 nm. The insulation film for preventing electrical discharge is decided according to the above-mentioned thermal oxidation process. If the insulation film is too thin, there is obtained no effect of preventing electrical discharge, whereas when it is too thick, the distance between the electrodes becomes too large. The above-mentioned ranges of the film thickness of the thermal oxide-film insulation film are actually feasible or allowable in actual processes, whereby a reasonable effect of preventing electrical discharge can be obtained. In order to make the following explanation concise, the substrate that has been completed in the processes up to the one in FIG. 2D is called an A substrate 16.

Figure 2E:
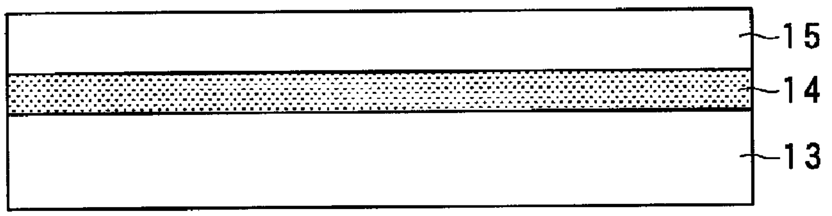

Then, one SOI (Silicon On Insulator) substrate that has been washed is prepared, as shown in FIG. 2E. Preferably, the thickness of a device layer 15 of this SOI substrate is in the range of from 10 nm to 5,000 nm, more preferably in the range of from 20 nm to 3,000 nm, and most preferably in the range of from 30 nm to 1,000 nm. The above-mentioned ranges of thickness of the device layer 15 can be achieved in the processes. Here, it is known that the square of an oscillation frequency is directly proportional to the ratio of spring rigidity to effective mass of the vibration membrane. A spring rigidity and an effective mass are required which correspond to the oscillation frequency at which an ultrasonic wave can be emitted. The spring rigidity and the effective mass of the vibration membrane are both functions of the film thickness of the vibration membrane. The above-mentioned ranges of the film thickness in the device layer 15 are those which can provide an appropriate spring rigidity and an appropriate effective mass as the vibration membrane of the CMUT in this embodiment.

Preferably, the thickness of a BOX (Buried Oxide) layer 14 of the above-mentioned SOI substrate is in the range of from 100 nm to 3,000 nm, and more preferably, in the range of from 200 to 1,000 nm. The above BOX layer is used as an etching stop layer which is to be described later. When considered from the internal stress of the oxide film, the selectivity of etching, the convenience of operation in actual processes, and so on, the above-mentioned film thickness of the BOX layer is in an appropriate range.

Figure 2F:
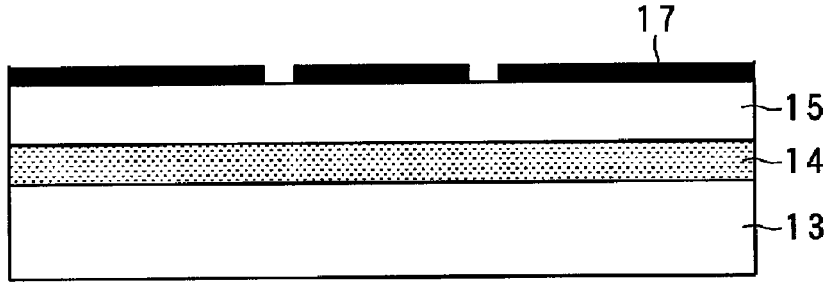

Subsequently, as shown in FIG. 2F, a SiN layer 17 is deposited on the device layer 15 according to an LPCVD (Low Pressure Chemical Vapor Deposition) method, and is subjected to patterning.

As shown in FIG. 1B, the shape into which the above-mentioned SiN layer 17 is patterned is formed of a plurality of circular holes, and these holes are distributed or arranged in a substantially ring shape. It is preferred that the diameter of each of the circular holes be in the range of from 10 nm to 3,000 nm. The above range of the circular hole diameter is actually feasible or allowable in actual processes. A process with a circular hole diameter below (smaller than) this range is very difficult. If circular holes of diameters beyond (larger than) this range are formed, protrusions of almost the same shapes as those of the circular holes are then formed, so the larger the protrusions, the more influence is exerted on the mass of the vibration membrane, thus reducing the accuracy of the process.

Figure 2G:
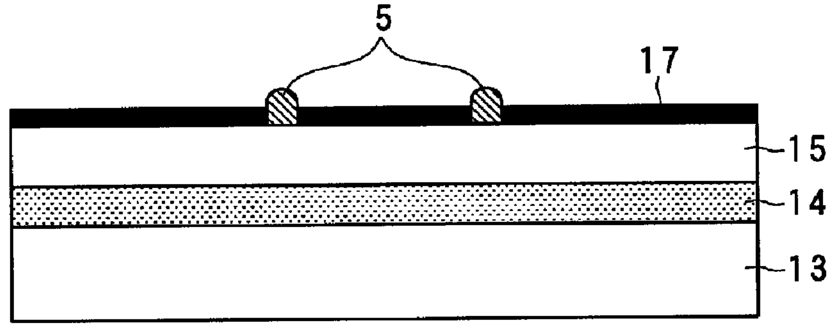

Thereafter, the substrate with the above-mentioned SiN layer is thermally oxidized. As shown in FIG. 2G, a part of the device layer 15 of the SOT substrate exposed from the SiN layer 17 is selectively oxidized, whereby the protrusions 5 are formed. A LOCOS (Local Oxidation of Silicon) process, which is a semiconductor process, is generally used for the above selective oxidation process. By adopting such a LOCOS process, only a region which is not enclosed by a nitride film is oxidized, so the control of the film thickness can be made easily.

Therefore, a lot of circular holes are formed through that portion of the device layer 15 which is exposed from the SiN layer 17, and are distributed or arranged in a substantially ring shape. Thus, the protrusions 5 similarly have a granular structure including a lot of substantially hemispheres, and are distributed or arranged in a substantially ring shape. Preferably, the height of the protrusions is in the range of from 1 nm to 1,000 nm, more preferably in the range of from 5 nm to 500 nm, and most preferably in the range of from 10 nm to 200 nm.

When the vibration membrane is placed in contact with the lower substrate, as will be described later, a local flexural boundary condition is provided by the above-mentioned height of the protrusions. Accordingly, when the protrusions come in contact with the lower substrate, it is not possible for the vibration membrane to be placed in contact with the lower substrate while going beyond the protrusions if a bending moment applied to the vibration membrane by an external force is not increased above a certain value.

That is, the contact region can be controlled according to the height of the protrusions. In that case, the range of the height of the protrusions can be controlled in an actual process. In addition, the area of contact can be effectively controlled by deciding a threshold for the bending moment applied to the vibration membrane.

Here, note that when the external force is applied to the vibration membrane thereby to place the vibration membrane in contact with the protrusions, the protrusions are forced to form gaps. In addition, in order to make, upon application of the external force, the outer peripheral portion of the vibration membrane (regions of the vibration membrane between the protrusions and the support member) to be collapsed or crushed, the external force to be applied should be much greater than that required in the case of no protrusions, and if otherwise, the outer peripheral portion of the vibration membrane is not pressed into a collapsed or crushed state. Here, note that the distribution or arrangement shape of the protrusions 5 may be a substantially ring shape or a substantially polygonal shape. In addition, in the absence of the protrusions 5, the area control of the contact region 9 can be made by other methods, too. For instance, the protrusions 5 may not be provided if a balance between the cavity 10 and external pressure is controlled in a precise manner.

Here, note that the following materials for the protrusions are suitable in relation to the following fusion bonding process. For the materials for the protrusions 5, there can be used at least one of an oxide film, a nitride film, an oxynitride film of Si, Ge, GaAs and so on, or at least one of Cu, W, Sn, Sb, Cd, Mg, In, Al, Cr, Ti, Au and Pt. In addition, combinations of the above materials, for instance, a multilayered structure, can be used.

Figure 2H:
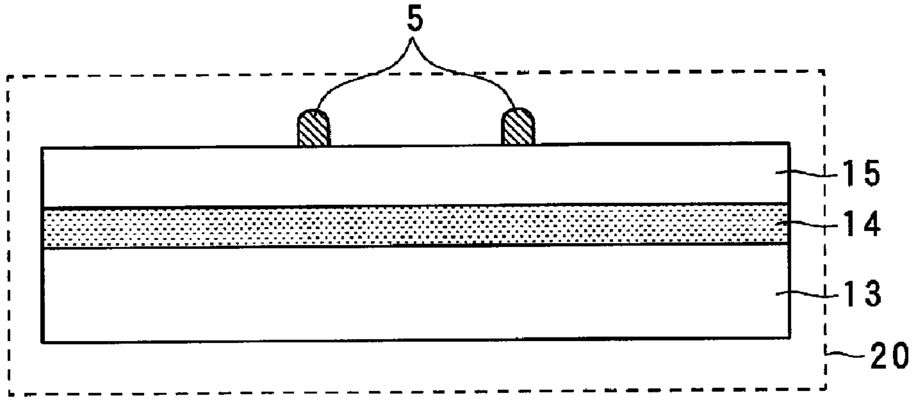

Next, as shown in FIG. 2H, the SiN layer 17 is etched and removed by the use of a heated liquid containing phosphoric acid. In order to make the following explanation concise, a substrate that has been completed in this manner is called a B substrate 20.

Figure 2I:
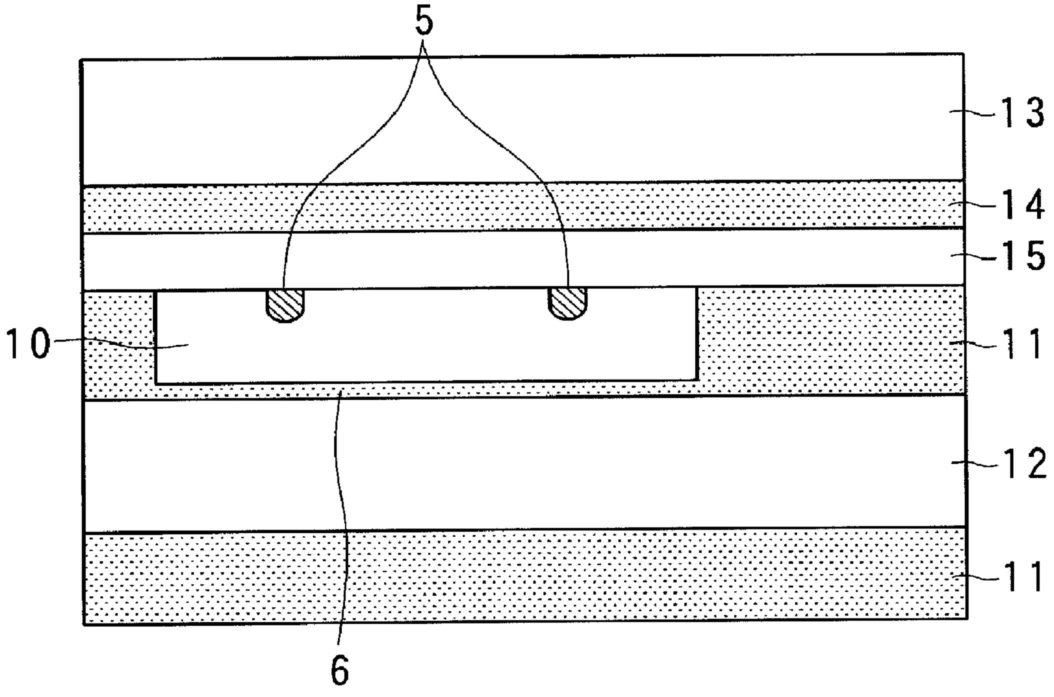

Then, as shown in FIG. 2I, the rear and the front of the B substrate 20 are reversed, placed on and joined or bonded to the A substrate 16 in alignment therewith, whereby the cavity 10 is formed therebetween.

An environmental pressure condition in the above bonding process may be one atmospheric pressure, but it is desirable to perform the bonding in vacuum. In case where the bonding is performed in vacuum, the pressure is preferably equal to or less than $10^4$ Pa, more preferably equal to or less than $10^2$ Pa, and most preferably equal to or less than 1 Pa. The higher the degree of vacuum, the lower the moisture is, and the smaller the degassing is in the subsequent processes, thus leading to a high yield. The above ranges of the degree of vacuum can permit the use of an ordinary vacuum bonding apparatus, and can provide a reasonable convenience of process operation.

Here, note that the temperature in the above bonding process is preferably in the range of from room temperature to 1,200 degrees C., more preferably from 80 degrees C. to 1,000 degrees C., and most preferably from 150 degrees C. to 800 degrees C. The higher the temperature of the bonding, the lower the subsequent degassing is, and the higher the strength of the bonding becomes, so higher bonding temperatures are more desirable. However, the stress due to the bonding remains, so unfavorable influences might be given to the vibration membrane. The above bonding temperature ranges can provide an appropriate bonding strength and a stable vibration membrane internal stress.

Thereafter, LPCVD SiN films are deposited over the entire surfaces of the substrates thus bonded, and an LPCVD SiN film on the B substrate side is removed by means of dry etching.

Subsequently, a handling layer 13 is wet etched with a heated alkaline liquid. The alkaline liquid is very high in the etching selection ratio of Si to SiO (in the range of from about 100 to 10,000), so the wet etching removes the handling layer 13, and stops at the BOX layer 14.

Figure 2J:
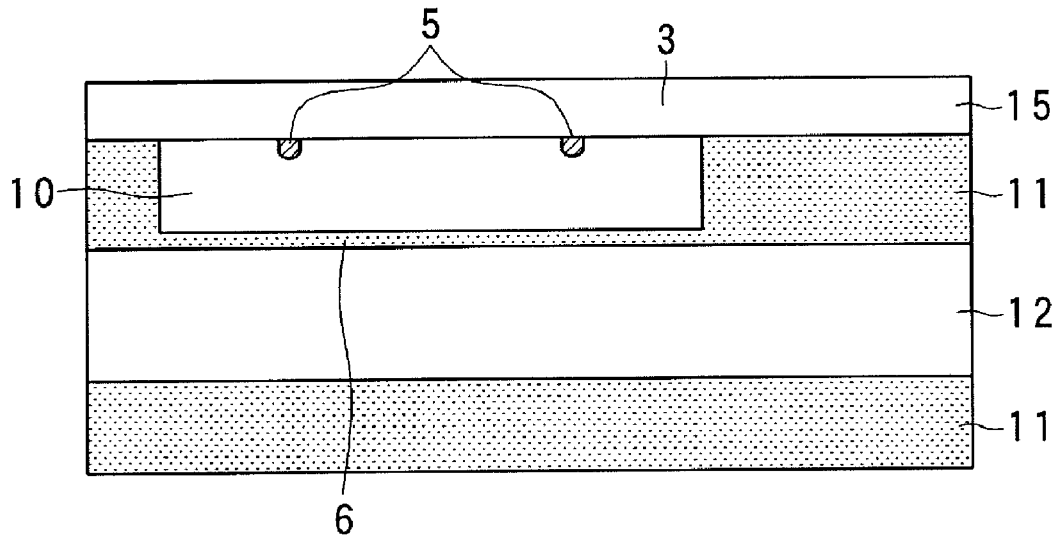

Then, as shown in FIG. 2J, in the BOX layer 14 is etched and removed by using a liquid containing hydrofluoric acid.

Here, note that when the vacuum bonding is performed, the device layer 15 of the B substrate is deformed downwardly into a concave shape under the action of atmospheric pressure. That is, the device layer 15 becomes a concave state without application of external forces other than atmospheric pressure, so it can serve as the vibration membrane 3 of the ultrasonic transducer of this embodiment. However, the embodiment is not limited to this, and the vibration membrane 3 can be further deformed downwardly by designing the thickness of the oxide film 11 and the size of the vibration membrane 3 in an appropriate manner, and by applying an appropriate external pressure.

Figure 2K:
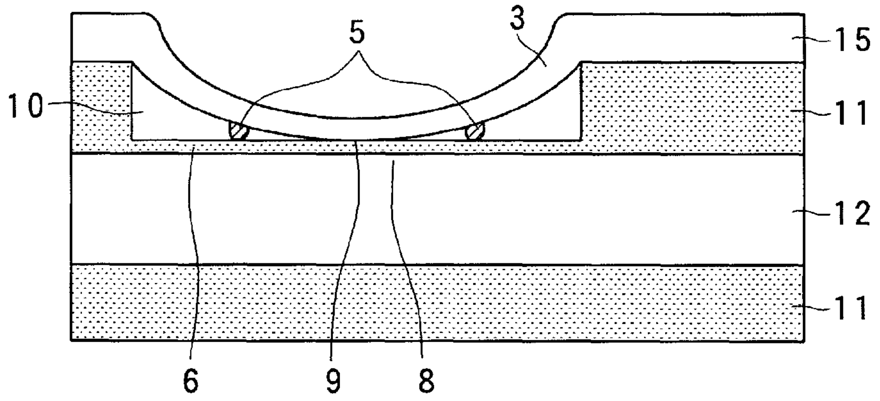

Thus, by performing the above-mentioned appropriate dimensional design, and by deciding the external pressure condition and applying an external pressure based thereon, the central portion of the vibration membrane 3 is brought into contact with the oxide film 11, whereby the contact region 9 can be formed, as shown in FIG. 2K. That is, it is possible to form a shape that can be operated in the above-mentioned collapse mode. In ordinary practice, the center of the vibration membrane 3 is a maximum point or location of displacement, so the contact region 9 is formed into a substantially concentric circular shape from the center of the vibration membrane 3. Moreover, because the variation of the shape in the contact region 9 is large when such a transducer is mass-produced, it is effective, in forming transducers into an array, to adopt a structure in which the above-mentioned protrusions 5 are arranged to surround the contact region.

Thereafter, this substrate is heated to plastically deform the vibration membrane 3 while forming the contact region 9 according to the above-mentioned appropriate dimensional design and the external pressure condition. In case where the vibration membrane 3 is made of Si, the heating temperature capable of plastically deforming the vibration membrane is preferably in the range of from 600 degree C. to 1,500 degrees C., more preferably in the range of from 650 degrees C. to 1,400 degrees C., and most preferably in the range of from 700 degrees C. to 1,300 degrees C. Because no plastic deformation is generated in single crystal Si even at a temperature of 600 degrees C. or below in a state in which an external force is applied thereto, the internal stress of this single crystal Si is a constant stable value.

In the same state, the internal stress of single crystal Si once decreases rapidly from 600 degrees C. or above, so that there soon occurs a plastic deformation like a stable "flow condition". The internal stress, which causes such a stable plastic deformation, is called "flow stress". Here, note that the melting point of Si is 1,414 degrees C. The thin Si film in the form of the vibration membrane 3, when once plastically deformed at high temperature, remains in the collapsed or crushed shape even if its temperature has returned to room temperature, and the shape of the vibration membrane does not restore to its original shape before the plastic deformation.

A plastic phenomenon will occur in Si when its temperature rises to a predetermined temperature or above. Thus, by heating the vibration membrane which is in contact with the substrate, the vibration membrane can keep its collapse mode even when its temperature returns to room temperature. In this case, no external force is required for keeping the collapse mode.

Further, a Si surface and a Si oxide membrane surface at opposite sides of the contact region 9 form chemical bonding in the above-mentioned high temperature range, so that they are bonded or fusion bonded to each other. In that case, the higher the temperature, or the longer the time of contact therebetween, the stronger the strength of the chemical bonding becomes.

In this embodiment, the strength of the chemical bonding is preferably in the range of from 1 MPa to 22 MPa, more preferably in the range of from 2 MPa to 21 MPa, and most preferably in the range of from 3 MPa to 20 MPa. The maximum strength of ordinary Si—Si bonding is in the vicinity of 20 MPa under a bonding process condition of 800 degrees C. or higher.

In this embodiment, the bonding is not limited to the above-mentioned method, but such bonding can also be made by van der Waals contact at room temperature. Thus, the bonding strength depends strongly on the temperature. Here, note that the plastic deformation of the internal Si of the vibration membrane 3 is a function of temperature, crystalline dislocation density, and strain rate.

In addition, in this embodiment, the crystalline dislocation density is preferably equal to or less than $10^5/cm^2$, more preferably equal to or less than $10^4/cm^2$, and most preferably equal to or less than $10^3/cm^2$. The plastic deformation characteristic of Si depends on an internal initial dislocation density of Si. In case where there is no initial dislocation density, i.e., in the case of substantially perfect single crystal Si and at a temperature of 800 degrees C. or above, plastic deformation starts at the instant when an external stress of about 100 MPa is applied. The stress at which such plastic deformation starts is called a plastic deformation starting stress. The more the Si internal initial dislocation density, the smaller the plastic displacement starting stress becomes. In case of $10^6/cm^2$, the plastic deformation starting stress is about 35 MPa, and is the same value as the above-mentioned flow stress, so the starting point of the plastic deformation becomes difficult to be observed. Here, note that an external pressure is sometimes applied so as to plastically deform the internal Si of the vibration membrane 3.

Moreover, in this embodiment, the Si internal stress generated by the external pressure is preferably in the range of from 10 MPa to 110 MPa, more preferably in the range of from 20 MPa to 110 MPa, and most preferably in the range of from 30 MPa to 90 MPa. This Si internal stress generated by the external pressure is the same meaning as the above-mentioned plastic deformation starting stress. For the same reason as that for the above-mentioned dislocation density, in order to possibly make the plastic deformation starting point easy to observe, it is desirable to provide a certain plastic deformation starting stress. Therefore, in the case of a temperature of about 800 degrees C., it is preferable that the plastic deformation starting stress be between 100 MPa (substantially perfect single crystal Si) and 35 MPa (flow stress).

Figure 2L:
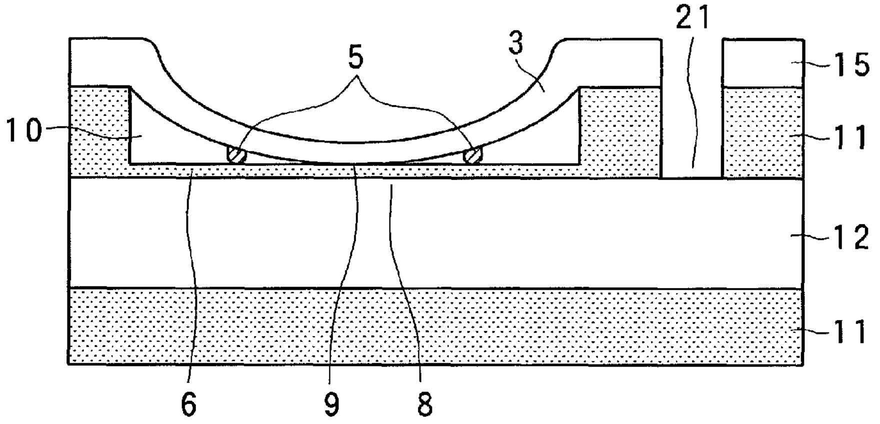

Then, the device layer 15 forming the vibration membrane 3 is patterned near the outer edge of the vibration membrane 3 by means of dry etching. The oxide film 11 is directly patterned by means of wet etching without removing a photoresist for the patterning of the device layer 15. An etching hole 21 is formed according to the above-mentioned process, as shown in FIG. 2L.

Figure 2M:
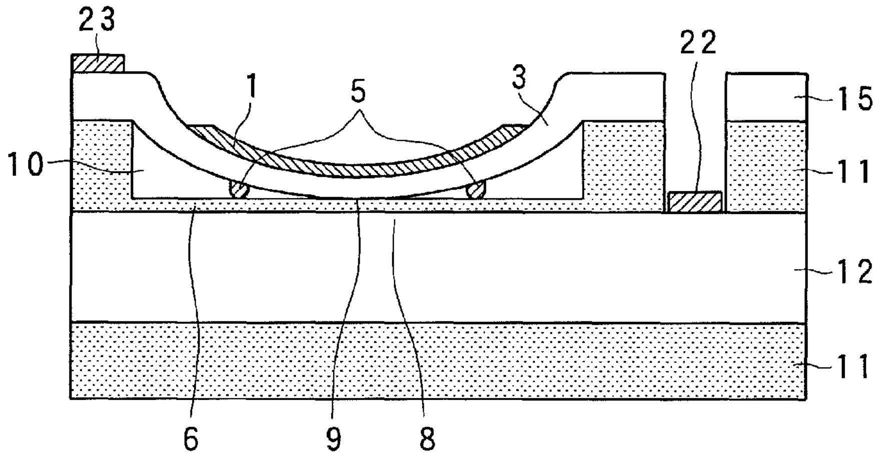

Subsequently, a metal film for electrodes is deposited and patterned to form the upper electrode 1, an upper electrode pad 23 and a lower electrode pad 22, as shown in FIG. 2M. Finally, in order to electrically separate or isolate multi-elements in this embodiment, the device layer 15 is patterned to complete an element array. However, a figure for such electrical separation is omitted. For the metal film, al least one is selected and used from the group comprising Al, Cr, Ti, Au, Pt, Cu, etc. Here, note that in the case of an ordinary ultrasonic transducer, the flexure of the vibration membrane 3 is equal to or less than several hundreds nm, and the size of the transducer (e.g., the diameter of the vibration membrane 3) is in the range of from several tens micrometers to several hundreds micrometers. Therefore, in an exposure process in the patterning process of the metal film, exposure shifts or variations such as optical diffractions can be corrected with the use of an ordinary photolithography or exposure machine.

In FIG. 2M, there is shown an optimal basic form of capacitive micromachined ultrasonic transducer according to this embodiment, wherein the lower electrode 8 is composed of a main body of the Si substrate 12. In case where this substrate main body is used as the electrode, the sheet electrical resistance of the Si substrate 12, which forms the lower electrode 8, is preferably equal to or less than 1.0 Ω/sq, more preferably equal to or less than 0.1 Ω/sq, and most preferably equal to or less than 0.02 Ω/sq. When the Si substrate itself is used as the lower electrode, it is preferred that the electrical resistance of the Si substrate be low, if possible. If the electrical resistance is made low in this manner, a potential difference due to the resistance becomes small, thus making it possible to reduce capacitance measurement errors between elements in the substrate surface. The above-mentioned values are in a desirable range where Si can be doped in the process. Here, note that a specific area of the lower electrode 8 is not shown in FIG. 2M.

In case where the Si substrate 12 is not used as the lower electrode, the lower electrode 8 having high electrical conductivity can be embedded or incorporated in the substrate 4, as shown in FIG. 1A. In this regard, when the vibration membrane 3 is made of Si having low electrical resistance, the vibration membrane itself can be used as the upper electrode, and it is not essential to arrange a metal electrode right above the vibration membrane. In another case, an additional insulation film can be provided on the vibration membrane 3 of low resistance, i.e., for instance, at least one selected from dielectric materials such as a SiN film, a SiO film, a SiNO film, $Y_2O_3$, HfO, HfAlO and so on can be provided, and the upper electrode can be further arranged on this insulation film. In the case of the vibration membrane 3 being made of an insulating material, the insulation film 6 made of a material of high permittivity such as, for example, a SiN film may be omitted. In this case, it is essential to arrange the upper electrode on the vibration membrane.

In the manufacture of the CMUT of this embodiment, other MEMS (MicroElectroMechanical Systems) technologies can be used. For instance, a well-known SM method (Surface Micromachining method; a method of removing a sacrificial layer to form a cavity), etc., can be used. Although in the foregoing description, reference has been made to the manufacture using a bonding technique, it is also possible to manufacture the capacitive micromachined ultrasonic transducer of this embodiment by using other MEMS technologies.

In addition, the cross sectional view of FIG. 2M shows the optimal basic form in this embodiment. To make the figure concise, a passivation layer for electrical wiring or the electrical wiring for the upper electrode 1 and the upper electrode pad 23 or the like to be formed thereon are not shown in the figure.

According to this embodiment, when the vibration membrane is caused to operate in a collapse mode, a part of the vibration membrane can be kept in contact with the substrate without any external force being applied thereto, so it becomes possible to reduce the required voltage in a stable manner. In addition, for the purpose of keeping the vibration membrane in contact with the substrate, there is no need for a fixing material such as resin, resist or the like. Accordingly, there is no influence from such a fixing material, so the variation of vibration is limited, thus making it possible to achieve the CMUT that is subjected to little or no change with the lapse of time or the like.

In addition, according to this embodiment, by the provision of the protrusions, it is possible to control the contact area between the vibration membrane and the underlayer substrate, whereby the dynamic range, bandwidth and so on can be increased. Also, the variation in the manufacturing processes in the manufacture of the CMUT can be decreased, thus making it easy to perform arraying due to the stable processes. Moreover, according to the capacitive micromachined ultrasonic transducer (CMUT) of this embodiment, it becomes possible to suppress unfavorable electrical influences on human bodies in medical diagnostics as much as possible.

Embodiment 2

Hereinafter, reference will be made to a capacitive micromachined ultrasonic transducer (CMUT) in a second embodiment of the present invention.

Figure 3:
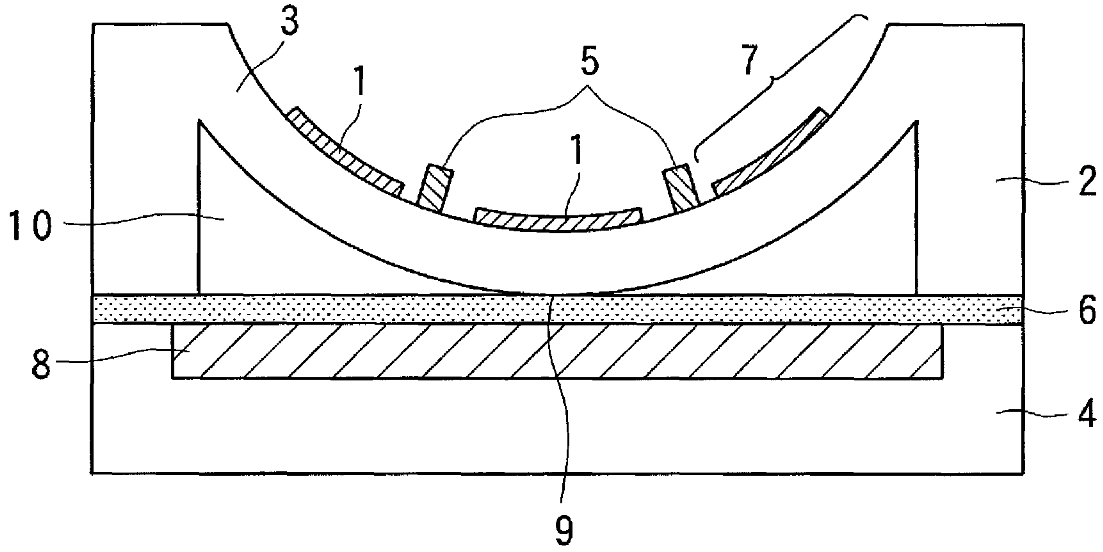
FIG. 3 is a conceptual cross sectional view illustrating a basic construction of a capacitive micromachined ultrasonic transducer (CMUT) in a second embodiment of the present invention.

FIG. 3 is a view illustrating the basic construction of the capacitive micromachined ultrasonic transducer (CMUT) in the second embodiment. Also, in FIG. 4, there is shown a conceptual plan view of this capacitive micromachined ultrasonic transducer (CMUT).

In the CMUT of this second embodiment, the difference thereof with respect to the CMUT in the first embodiment of the present invention as shown in FIG. 1A and FIG. 1B is that protrusions 5 are formed on an upper portion of a vibration membrane 3 so as to be distributed in a substantially ring-shaped manner, and that a lower electrode 8 is embedded or incorporated in an underlayer substrate. Because a basically different construction is only the above-mentioned construction, those components of this second embodiment which correspond to those of the construction of the CMUT in the first embodiment of the present invention as shown in FIG. 1A and FIG. 1B are identified by the common symbols, and the explanation of the overlapping parts is omitted.

Figure 4:
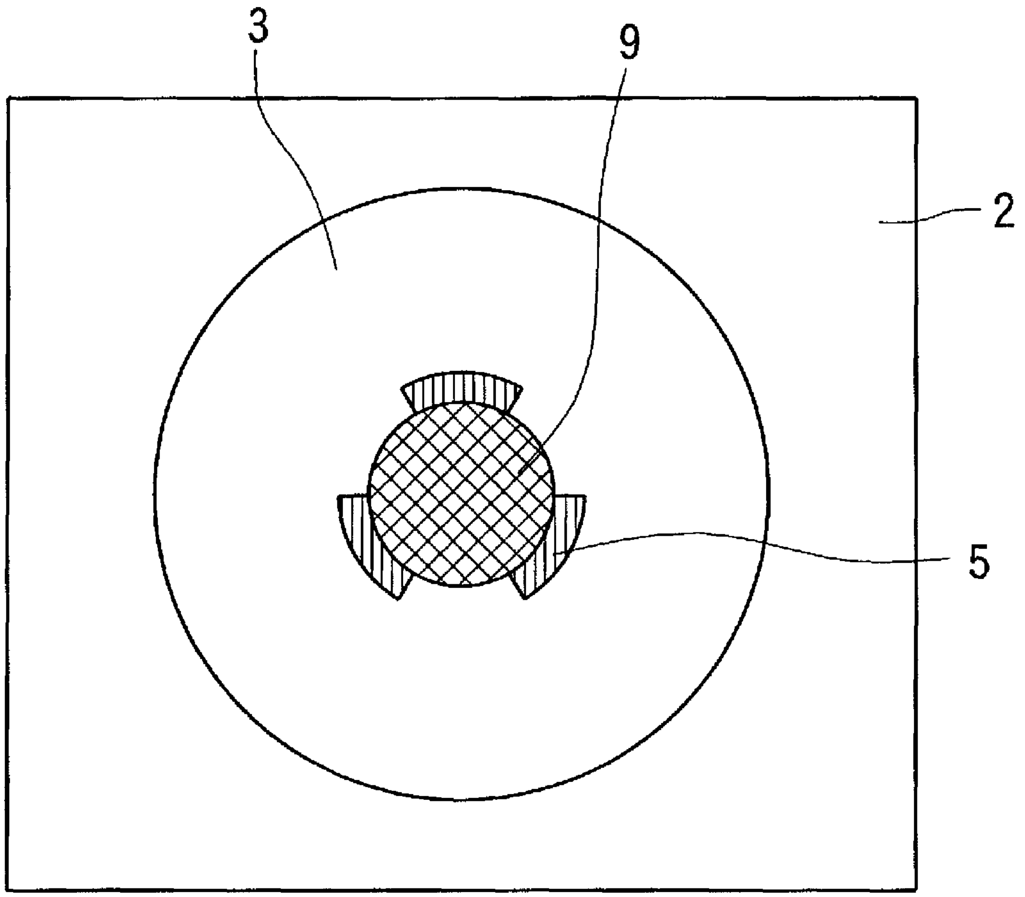
FIG. 4 is a conceptual cross sectional view illustrating the basic construction of the capacitive micromachined ultrasonic transducer (CMUT) in the second embodiment of the present invention.

In case where the protrusions are formed on the upper portion of the vibration membrane, as in this embodiment, when the vibration membrane is placed in contact with the lower substrate, a local flexural boundary condition is provided by the protrusions. This will be considered by taking as an example the case in which the protrusions 5 are arranged on the upper portion of the vibration membrane 3 in a substantially ring-shaped manner, as shown in FIG. 4.

In order to cause a region of the vibration membrane enclosed or surrounded in a substantially ring-shaped manner to be collapsed or crushed into contact with the insulation film 9 by applying an external force to the vibration membrane, it is necessary to raise a bending moment applied to the vibration membrane to a certain extent. That is, the region of the vibration membrane surrounded by the protrusions is less prone to be bent than in the remaining portion thereof not surrounded by the protrusions. Accordingly, the contact region can be controlled by means of the formation of such protrusions. In that case, the arrangement of the protrusions and the like can be controlled in an actual process, and in addition, the area of contact can be effectively controlled by deciding a threshold for the bending moment applied to the vibration membrane.

Next, reference will be made to a method for manufacturing a capacitive micromachined ultrasonic transducer (CMUT) according to the second embodiment of the present invention.

FIG. 5A through FIG. 5M are views illustrating the manufacturing processes or steps for the capacitive micromachined ultrasonic transducer (CMUT) in the second embodiment of the present invention.

Figure 5A:
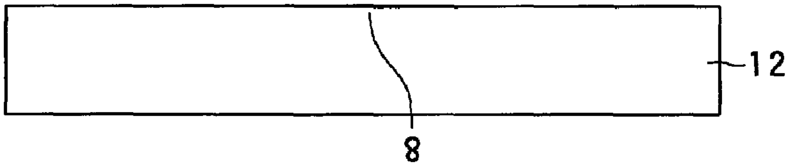
FIG. 5A through FIG. 5M are views illustrating manufacturing processes or steps for the capacitive micromachined ultrasonic transducer (CMUT) in the second embodiment of the present invention.
Figure 5B:
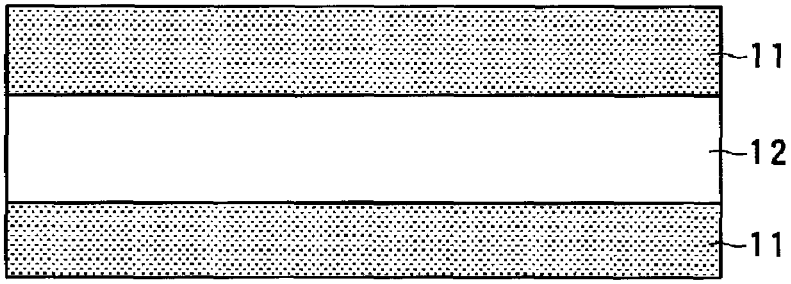
Figure 5C:
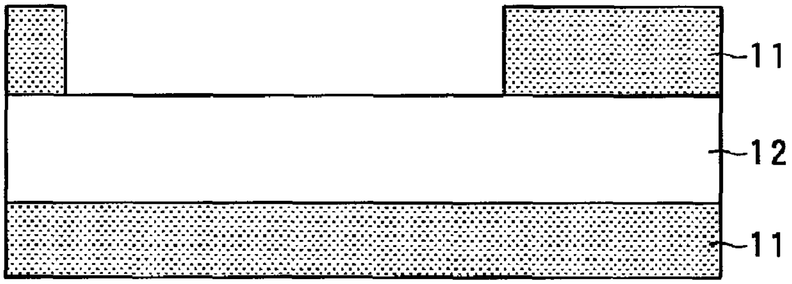
Figure 5D:
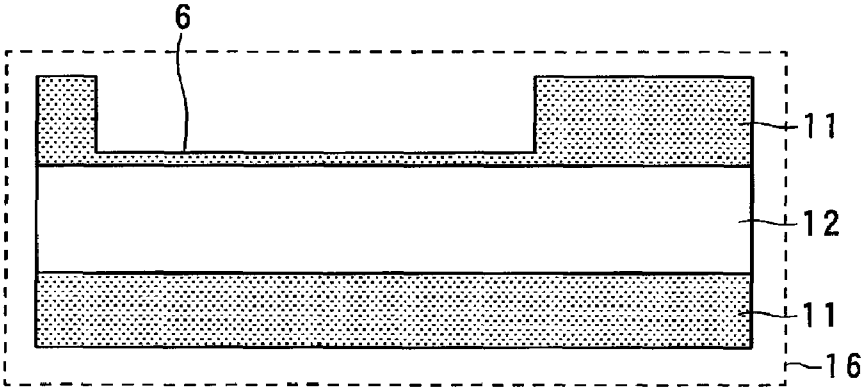

First of all, as shown in FIG. 5A, the Si substrate 12 is washed and prepared. After that, a surface of the Si substrate is made low in resistance by means of a diffusion method or an ion implantation method. Thus, the surface region that has been made low in resistance is incorporated, as the lower electrode 8, into the underlayer substrate, as shown in FIG. 3 described above. The surface resistance value of the Si substrate having been made low in resistance is preferably equal to or less than 10 Ω-cm, more preferably equal to or less than 1 Ω-cm, most preferably equal to or less than 0.1 Ω-cm. As stated above, when the Si substrate itself is used as the lower electrode, it is preferred that the electrical resistance of the Si substrate be low, if possible. If the electrical resistance is made low, a potential difference due to the resistance becomes small, and hence capacitance measurement errors between elements in the substrate surface can be reduced. The above-mentioned values are in a feasible and desirable range where Si can be doped in the process. In addition, in FIG. 5A through FIG. 5M, the lower electrode 8 is the surface of the substrate 12, and no specific area is illustrated.

The processes or steps in FIG. 5A through FIG. 5D are the same as the processes or steps in FIG. 2A through FIG. 2D in the above-mentioned first embodiment, and a completed substrate is called an A substrate 16.

Figure 5E:
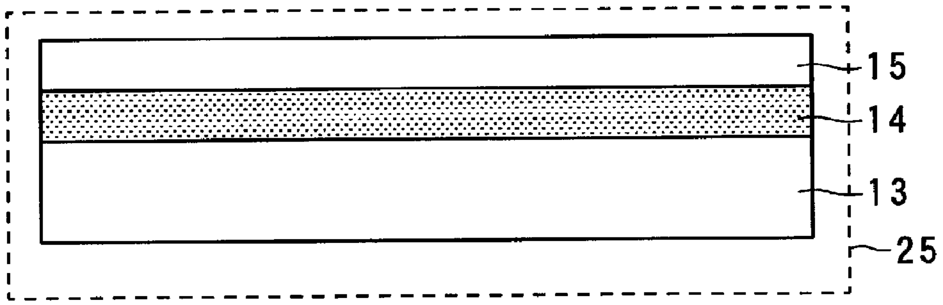

As shown in FIG. 5E, one SOI substrate (e.g., SIMOX SOI substrate or Smart-Cut SOI substrate) is washed and prepared. This substrate is called a C substrate 25.

Figure 5F:
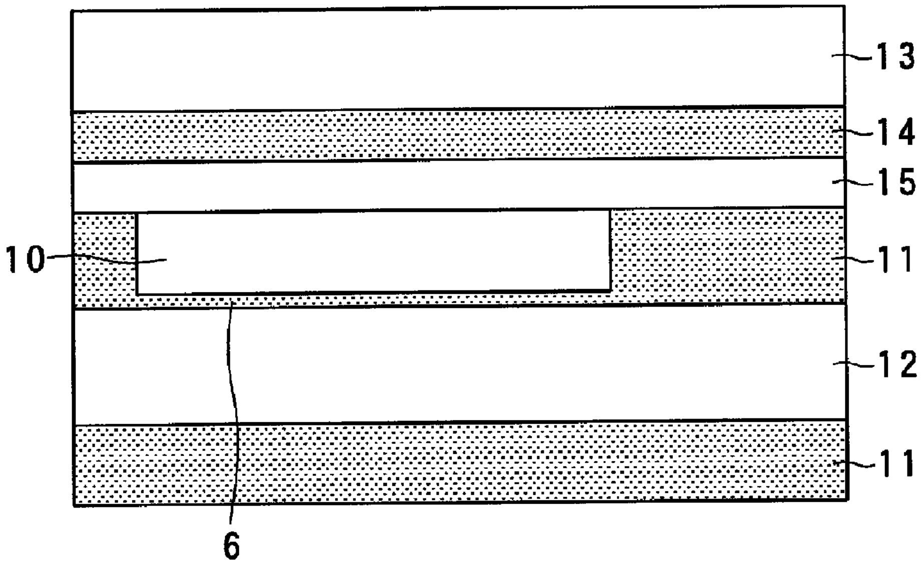

Then, as shown in FIG. 5F, the rear and the front of the C substrate 25 are reversed, and joined or bonded to the A substrate 16, whereby a cavity 10 is formed. In the bonding process, there is no need for alignment. Here, note that in the bonding process, the surface of a bonding surface is activated at room temperature, and the bonding is performed at a temperature of 150 degrees C. or less and at a pressure of $10^{-3}$ Pa (e.g., EVG 810, 520 manufactured by EVG).

Subsequently, the handling layer 13 of the substrate thus joined or bonded as described and shown in FIG. 5F is ground in such a manner that the handling layer 13 having a thickness of about several tens micrometers is left and washed. After that, the handling layer 13 is completely etched by a KOH liquid of 80 degrees C. while completely protecting the rear surface of the ground substrate with the use of a single-sided etching jig (e.g., a wafer holder manufactured by Silicet AG in Germany).

Figure 5G:
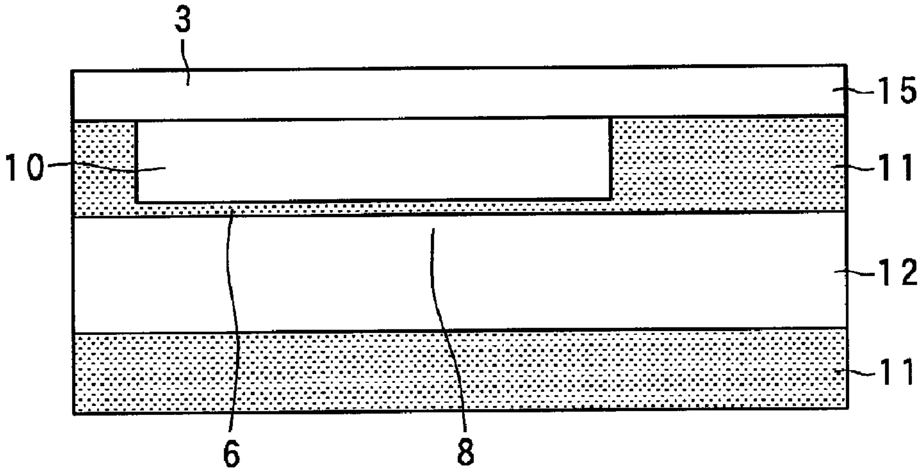

Thereafter, the BOX layer 14 is completely etched by means of liquid containing fluorine, so that the device layer 15 is exposed, as shown in FIG. 5G. This device layer 15 is used as the vibration membrane 3 of this embodiment.

Figure 5H:
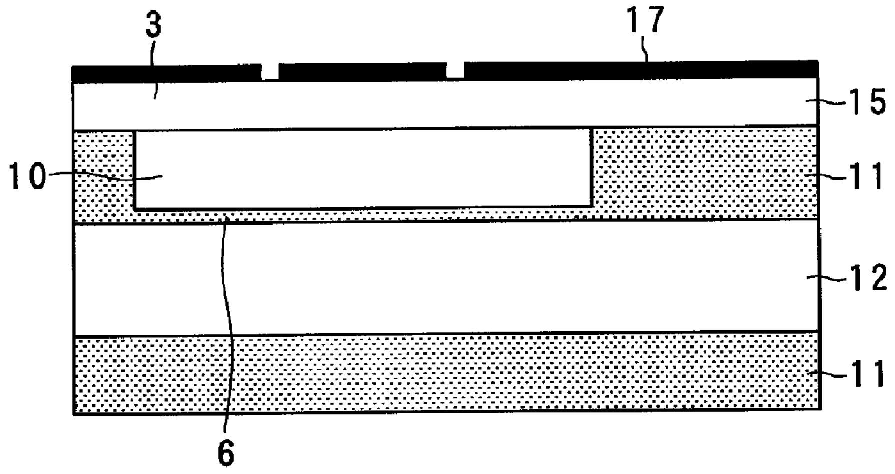

Then, as shown in FIG. 5H, the SiN film 17 is deposited according to the LPCVD method, and is subjected to patterning by means of dry etching.

Figure 5I:
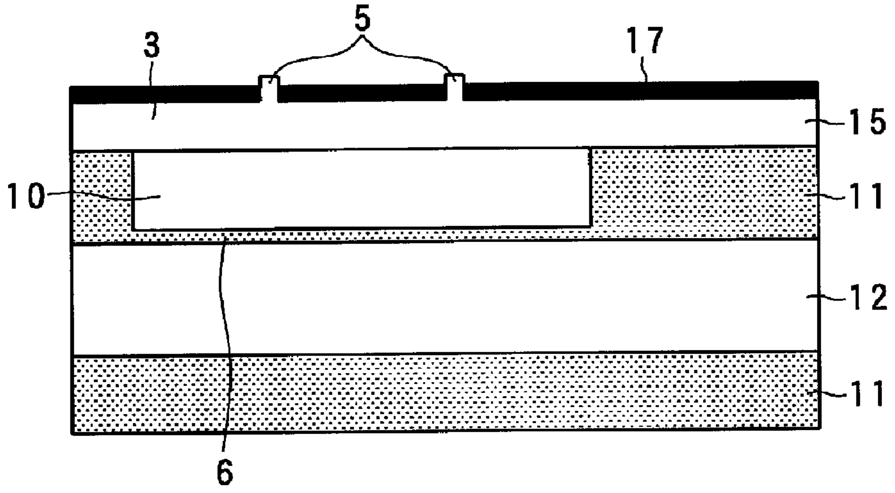

Subsequently, as shown in FIG. 5I, the protrusions 5 are caused to grow by means of an epitaxy method. The protrusions 5 grow up from the Si surface of the device layer 15 exposed to the SiN film 17. The height of the protrusions 5 thus grown is preferably in the range of from 1 nm to 1,000 nm, more preferably in the range of from 5 nm to 500 nm, and most preferably in the range of from 10 nm to 200 nm. Here, note that a method of growing a crystal only from an exposed place as described above is called a selective epitaxy. It is also possible to use a SiO film, a SiON film or the like in place of the patterned SiN film 17.

Here, note that as the above-mentioned epitaxy method, there can be used one of an MBE (Molecular Beam Epitaxy) method, an LPE (Liquid Phase Epitaxy) method, an SPE (Solid Phase Epitaxy) method and so on.

Also, as the above-mentioned selective epitaxy method, there can be used alternative methods. For instance, the above-mentioned pattering of the protrusions 5 can be performed by the use of a PVD (Physical Vapor Deposition) method or a CVD (Chemical Vapor Deposition) method, and by adding an etching method or a lift-off method.

Figure 5J:
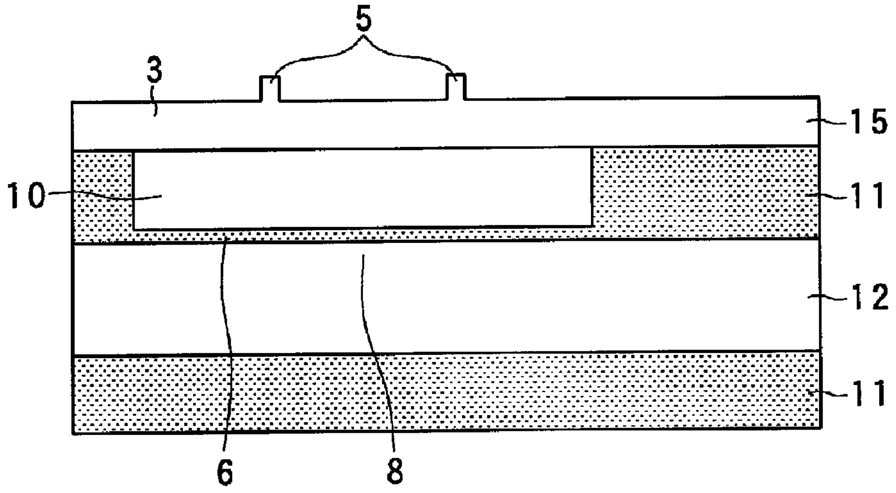

Thereafter, the above-mentioned SiN film 17 is removed by etching with the use of a liquid containing phosphoric acid of about 160 degrees C., whereby the vibration membrane 3 provided with the protrusions 5 is completed, as shown in FIG. 5J. Here, note that in this embodiment, the shape of the vibration membrane 3 has a thickness of 340 nm, and is a square having each side of about 40 micrometers. Also, the amount of displacement of the central portion of the vibration membrane 3 by atmospheric pressure is about 360 nm. In addition, the above-mentioned substrate is placed in an autoclave, and the central portion of the vibration membrane 3 is brought into contact with the insulation film 6 under the cavity 10 by applying a pressure of about 2.65 atm or higher in case where the height of the cavity 10 is 600 nm. The distribution or arrangement of the protrusions 5 is substantially in the shape of a ring or circle having an internal diameter of 8 micrometers and a width of about 2 micrometers, at the center of the vibration membrane 3 as shown in FIG. 4.

In the case of applying an external pressure of 4 atm, the central portion of the vibration membrane 3 is placed in contact with the insulation film 6, whereby a contact region 9 having a diameter of 8 micrometers, substantially the same as that of the circularly arranged protrusions 5 is formed. Here, note that in case where the protrusions 5 are not provided, the size of the contact region 9 depends strongly on the distribution of the external pressure, minute pressure variation, and the size and the boundary conditions of the vibration membrane 3, so the difference or variation between elements (transducers) becomes great. On the other hand, by the provision of the protrusions 5, it is possible to form the contact region 9 with substantially the same shape as the distributed or arranged shape of the protrusions 5 even if there is a difference or variation between the elements.

Figure 5K:
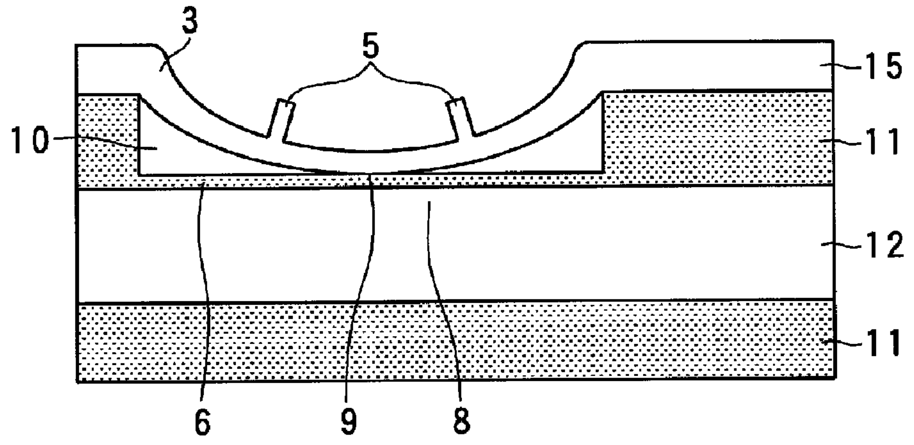

By applying the external pressure as described in FIG. 2K and a temperature of about 800 degrees C., a plastic phenomenon appears to Si, whereby an element having the contact region 9 formed therein, as shown in FIG. 5K, is completed. The thus completed element, even if returned to room temperature, can keep its state in which the vibration membrane is in contact with the substrate, so it can be made to operate as a collapse mode without any external force being applied thereto.

Figure 5L:
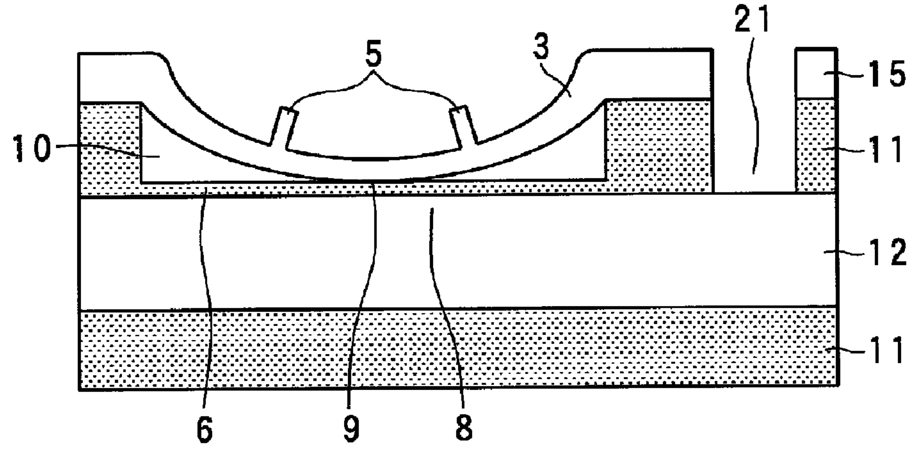

Then, the device layer 15 forming the vibration membrane 3 is patterned near the outer edge of the vibration membrane 3 by means of dry etching. After that, an oxide film 11 is directly patterned by means of wet etching without removing a photoresist for the patterning of the device layer 15. An etching hole 21 is formed according to the above-mentioned process, as shown in FIG. 5L.

Figure 5M:
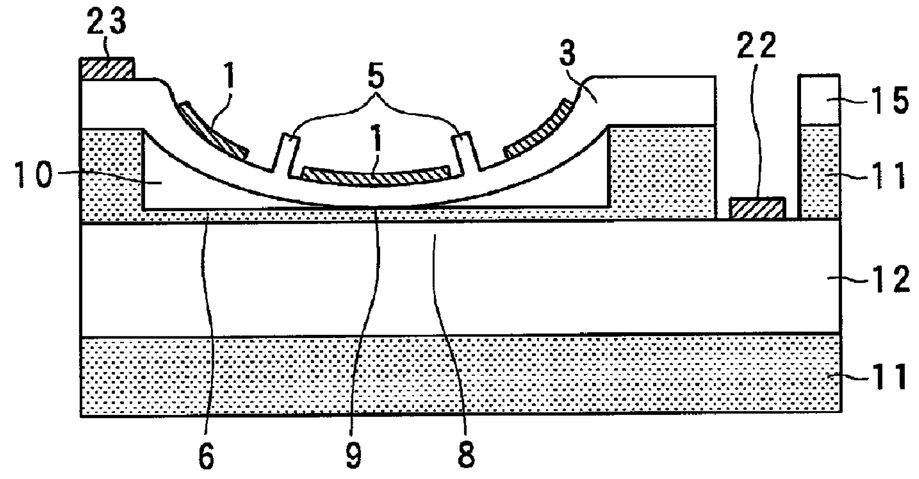

Subsequently, Al for electrodes is deposited by sputtering, and is then subjected to patterning by means of wet etching, whereby an upper electrode 1, an upper electrode pad 23 and a lower electrode pad 22 are formed, as shown in FIG. 5M. Here, note that the above-mentioned Al electrodes can thereafter be annealed to form ohmic contact. It is preferred that the temperature of the annealing be in the range of from 200 degrees C. to 450 degrees C. This is the temperature range of annealing when ordinary Al electrodes perform ohmic contact.

Finally, in order to electrically separate or isolate multi-elements in this embodiment, the device layer 15 is patterned to complete an element array. However, it is omitted here to illustrate such electric separation or isolation. Moreover, a passivation layer for electrical wiring or the electrical wiring for the upper electrode 1 and the upper electrode pad 23 or the like to be formed thereon are not shown in the figure. Here, it is preferred that the above-mentioned passivation layer be composed of a SiO film or a SiN film which can be formed at low temperature by means of a PVD method.

Embodiment 3

Figure 6:
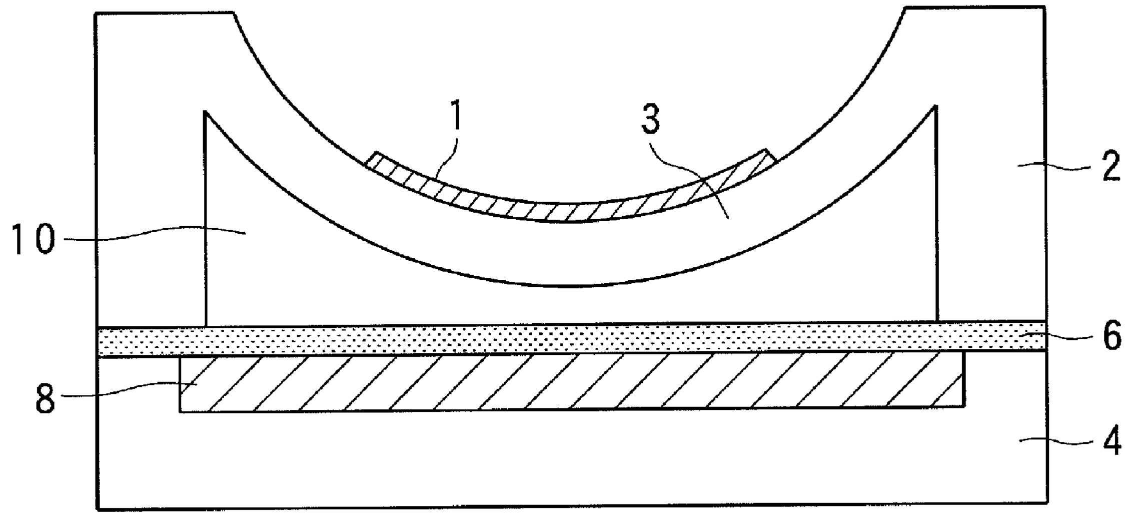
FIG. 6 is a conceptual cross sectional view illustrating a basic construction of a capacitive micromachined ultrasonic transducer (CMUT) in a third embodiment of the present invention.

Reference will be made to a capacitive micromachined ultrasonic transducer (CMUT) according to a third embodiment of the present invention. FIG. 6 is a conceptual cross sectional view illustrating a basic construction of the capacitive micromachined ultrasonic transducer (CMUT) in the third embodiment of the present invention. In FIG. 6, 1 designates an upper electrode which is a first electrode, 2 a vibration membrane support member, 3 a vibration membrane, 4 a substrate, 6 an insulation film, 8 a lower electrode which is a second electrode, and 10 a cavity which is a gap.

The CMUT of this embodiment includes, as shown in FIG. 6, the vibration membrane 3 provided with the upper electrode 1, the substrate 4 provided with the lower electrode 8, and the vibration membrane support member 2 that serves to support the vibration membrane so as to form the gap 10 between the vibration membrane and the substrate with these electrodes being arranged in opposition to each other. Here, note that the lower electrode 8 itself may be used as the substrate, or the vibration membrane 3 itself may be used as the upper electrode.

Figure 7:
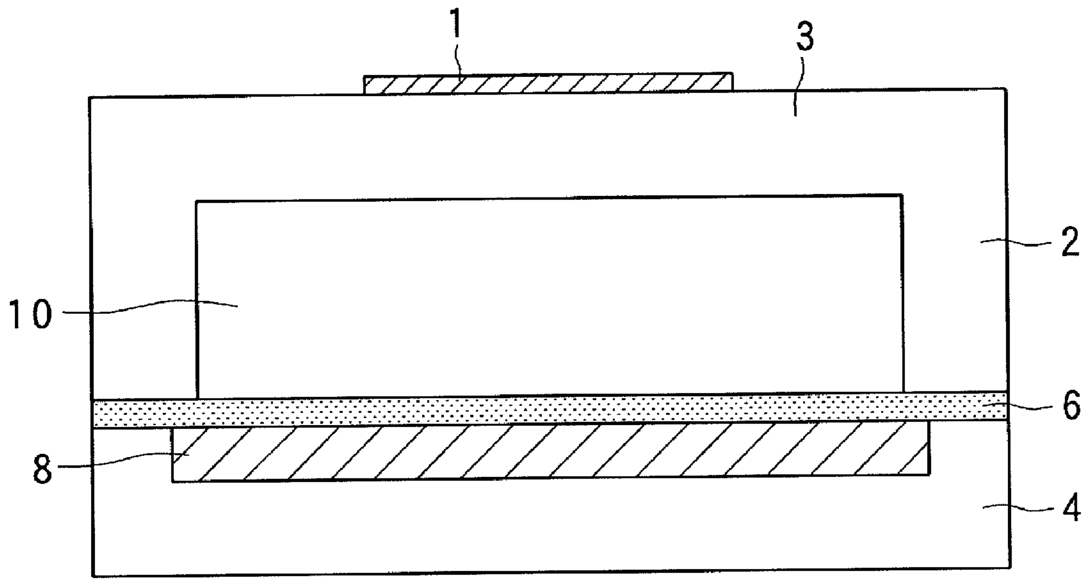
FIG. 7 is a schematic cross sectional view illustrating a neutral position of a vibration membrane in the third embodiment.

The vibration membrane 3 keeps its state in which it is flexed toward the substrate 4 side from its neutral position with no external force being applied to the vibration membrane 3. Here, the neutral position of the vibration membrane means a position in which the vibration membrane supported by the vibration membrane support member is parallel to the substrate, without being in a concave shape and in a convex shape, as shown in FIG. 7. In general, the vibration membrane may sometimes be in a state slightly flexed toward the substrate side from the neutral position under the action of its own weight or a pressure difference between the cavity 10 and the outside of the element, but in the present invention, it is featured that the vibration membrane is in such a state even if these external forces do not act thereon. If a DC voltage is applied to the lower electrode 8, the vibration membrane is forced into a state more flexed toward the substrate side, so even in a conventional mode, it is possible to reduce the DC voltage required to achieve the same flexed state (the same amount of flexure) as that in a conventional case.

Here, if an alternating voltage is further applied in an overlapped manner (in addition to the DC voltage), the vibration membrane 3 is caused to vibrate, thereby making it possible to emit an ultrasonic wave. In addition, when an ultrasonic wave is received by the vibration membrane, a change in capacitance between the electrodes is caused by the vibration of the vibration membrane, and it can be detected by an electric signal.

Next, reference will be made to a method for manufacturing a capacitive micromachined ultrasonic transducer (CMUT) according to the third embodiment of the present invention, but basic processes are similar to those described with reference to the first and second embodiments. However, when plastically deforming Si, which forms the vibration membrane, by applying heat thereto, the vibration membrane should be placed in a state in which it is not in contact with the substrate but it is flexed toward the substrate side from its neutral position. The degree of flexure of the vibration membrane can be changed in an appropriate manner by adjusting the external pressure when heating the vibration membrane. Thus, it is possible to plastically deform the vibration membrane to a desired degree of flexure. Process conditions for the plastic deformation are the same as the conditions described in Embodiment 1.

The vibration membrane obtained in this manner keeps its state or shape prior to heating thereof without restoring to the neutral position even if returned to room temperature. Therefore, it is possible to achieve the CMUT that is in a state flexed toward the substrate side from the neutral position without the need to apply any external force to the vibration membrane.

The present invention is not limited to the above embodiments, and various changes and modifications can be made within the spirit and scope of the present invention. Therefore, to apprise the public of the scope of the present invention, the following claims are made.

This application claims the benefit of Japanese Patent Application No. 2007-246868, filed on Sep. 25, 2007, which is hereby incorporated by reference herein in its entirety. This application claims the benefit of Japanese Patent Application No. 2008-235056, filed on Sep. 12, 2008, which is hereby incorporated by reference herein in its entirety.

The invention claimed is:

1. A method for manufacturing an electromechanical transducer, in which the electromechanical transducer includes a vibration membrane provided with a first electrode, a substrate provided with a second electrode, and a support member adapted to support the vibration membrane in such a manner that a gap is formed between the vibration membrane and the substrate with the first and second electrodes being arranged in opposition to each other, said method comprising:

forming a structure in which the vibration membrane is manufactured in such a manner that a part of the vibration membrane is made to operate in a collapse mode while keeping a state of contact thereof with a region of the substrate including the second electrode by plastic deformation caused by flow stress, wherein the plastic deformation is performed after the vibration membrane is deposited.

2. The method for manufacturing an electromechanical transducer according to claim 1, further comprising:

fusion bonding a part of the vibration membrane that has been plastically deformed to the region of the substrate when the structure is formed to keep the state of contact.

3. The method for manufacturing an electromechanical transducer according to claim 2, further comprising:

forming protrusions on at least one of an upper surface and a lower surface of the vibration membrane, wherein, when the structure to keep the state of contact is formed, the vibration membrane is brought into contact with, or is fusion bonded to, the substrate through the protrusions.

4. The method for manufacturing an electromechanical transducer according to claim 3, wherein the protrusions have a height in a range of from 10 nm to 200 nm.

5. The method for manufacturing an electromechanical transducer according to claim 3, wherein the protrusions are formed in a ring shape so as to surround the region in which the state of contact is kept.

6. The method for manufacturing an electromechanical transducer according to claim 1, wherein the vibration membrane serves as the first electrode.

7. The method for manufacturing an electromechanical transducer according to claim 1, wherein the substrate serves as the second electrode.

8. The method for manufacturing an electromechanical transducer according to claim 1, wherein the vibration membrane is deposited on the support member.

9. A method for manufacturing an electromechanical transducer, in which the electromechanical transducer includes a vibration membrane provided with a first electrode, a substrate provided with a second electrode, and a support member adapted to support the vibration membrane in such a manner that a gap is formed between the vibration membrane and the substrate with the first and second electrodes being arranged in opposition to each other, said method comprising:

forming a state in which the vibration membrane is flexed toward the substrate from a neutral position of the vibration membrane, by plastic deformation caused by flow stress, wherein the plastic deformation is performed after the vibration membrane is deposited.

10. The method for manufacturing an electromechanical transducer according to claim 9, wherein the vibration membrane is deposited on the support member.

* * * * *